(12) United States Patent
Lohberg et al.

(10) Patent No.: US 6,442,502 B1
(45) Date of Patent: Aug. 27, 2002

(54) SYSTEM FOR DETECTING ROTATING SPEED

(75) Inventors: Peter Lohberg, Friedrichsdorf; Heinz Loreck, Idstein; Wolfgang Fey, Niedernhausen, all of (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 09/423,032

(22) PCT Filed: Apr. 6, 1998

(86) PCT No.: PCT/EP98/01983
§ 371 (c)(1),
(2), (4) Date: Jan. 20, 2000

(87) PCT Pub. No.: WO98/49564
PCT Pub. Date: Nov. 5, 1998

(30) Foreign Application Priority Data

Apr. 30, 1997 (DE) .......................................... 197 18 141

(51) Int. Cl.$^7$ ................................................. G01P 3/00
(52) U.S. Cl. ..................... 702/145; 702/146; 324/161; 324/166
(58) Field of Search .......................... 72/142, 145, 146, 72/148; 318/798–799, 802, 806; 324/161, 166, 169–170; 123/406.12, 631, 632

(56) References Cited

U.S. PATENT DOCUMENTS

| | | | |
|---|---|---|---|
| 4,086,532 A | | 4/1978 | Aronson et al. |
| 4,389,993 A | * | 6/1983 | Long et al. ............. 123/406.53 |
| 4,456,868 A | * | 6/1984 | Yamamura et al. ......... 318/802 |
| 4,721,895 A | | 1/1988 | Cocksedge et al. |
| 4,873,642 A | * | 10/1989 | Mieno et al. ............... 123/697 |

FOREIGN PATENT DOCUMENTS

| | | |
|---|---|---|
| DE | 41 33 837 | 4/1993 |
| DE | 44 06 606 | 9/1995 |
| DE | 44 34 978 | 4/1996 |
| DE | 44 45 378 | 6/1996 |
| DE | 19634715 A1 * | 8/1996 |
| DE | 196 18 867 | 2/1997 |
| DE | 195 34 566 | 3/1997 |
| DE | 196 34 715 | 3/1998 |
| JP | 1 31053 | 1/1989 |
| JP | 01 065921 | 3/1989 |

OTHER PUBLICATIONS

Search Report of the German Patent Office for Application No. 197 18 141.4.

* cited by examiner

Primary Examiner—Bryan Bui
(74) Attorney, Agent, or Firm—Rader, Fishman & Grauer PLLC

(57) ABSTRACT

An arrangement for sensing the rotational speeds of a wheel or any other rotating member includes a sensor module with a sensor element, a controllable current source with a modulator and a signal conditioning and evaluating circuit. The modulator controls the current source in response to the signals of the sensor element and/or external signals and, as an output signal of the sensor module, delivers a current signal representative of the rotational behavior with status or additional signals superposed on the current signal. The evaluating circuit of the sensor module includes at least two different signal-conditioning networks which, by way of a control network, in dependence on predetermined criteria or conditions, are connected between the sensor element and the modulator controlling the current source and take care of signal conditioning. The shift from one signal-conditioning network to another occurs in response to control signals which the control network derives automatically from the control of one of these networks, or in response to control signals which are sent to the control network by a signal-receiving external circuit outside the sensor module via the same signal line.

7 Claims, 2 Drawing Sheets

Fig. 3
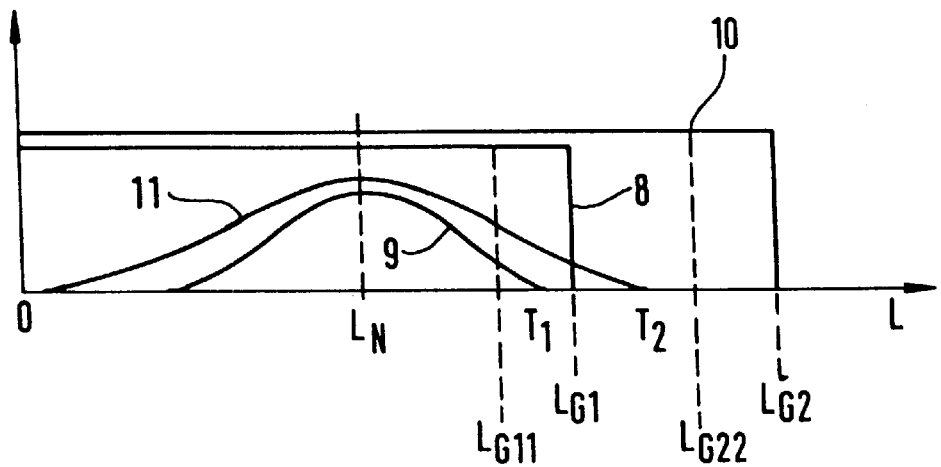
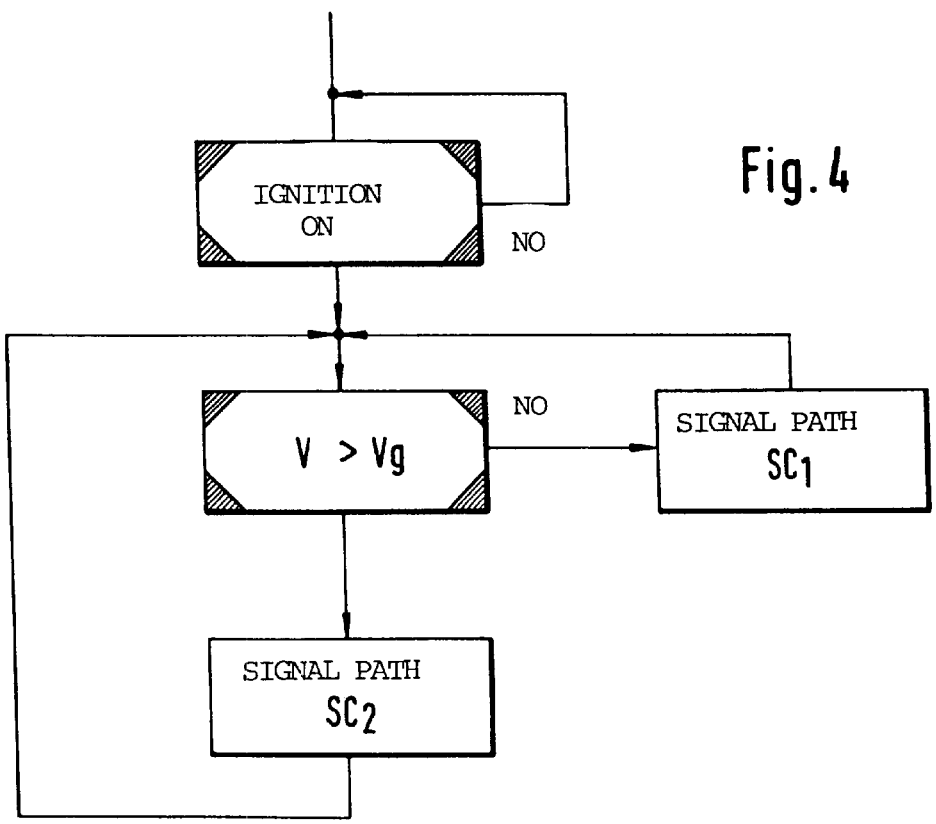
Fig. 4

SYSTEM FOR DETECTING ROTATING SPEED

TECHNICAL FIELD

The present invention generally relates to sensors for sensing positions, shifts in positions, rotational speeds and more particularly, relates to wheel speed sensors

BACKGROUND OF THE INVENTION

An arrangement of this type is disclosed in German patent application No. 196 18 867. In this application, a system for varying a rotational speed signal is described wherein information about the direction of rotation, the air gap, brake lining wear, etc., is superposed on the output signal which prevails in the shape of a binary current or voltage signal.

Further, an active motion sensor with an evaluating circuit is known from German patent application No. 44 34 798. A testing mode is provided in this circuit for testing the 'air gap reserve' which is required for compensating dynamic air gap variations or air gap tolerances. In the testing mode, a second hysteresis threshold determines the switch-over of the rotational speed signals during change of the edges of the sensor signal. Switch-over to the hysteresis threshold envisaged for testing is effected, for example, by varying the operating voltage of the sensor. Also, provision is made to switch back to the normal mode as soon as the vehicle wheel reaches a determined speed.

Japanese patent application No. 1065921 discloses the parallel connection of two signal amplifier circuits, one circuit processing a relatively low frequency band, and the parallel circuit processing a higher frequency band. The signal representative of the high input frequency and that one representative of the low input frequency are superposed after amplification in order to achieve a desired frequency characteristics of the amplifier circuit.

The object of the present invention is a sensor arrangement for sensing rotational speeds, positions, shifts in positions, and motional speeds in the field of mechanical engineering, however, more particularly, in the automotive vehicle industry, predominantly in the range of application of controlled brakes, for position indicators, angular position indicators, motive adjustment devices, or for sensing wheel rotational speeds. Sensor arrangements of different types for the above-mentioned purpose are known in the art. Normally, these arrangements comprise a signal generator or pulse generator which is mechanically coupled to the moving machine part, and a sensor or pickup for measuring data which scans the pulse generator. The present invention can be used for arrangements where scanning is carried out by means of light, high frequency, electrical or magnetic fields, especially by means of permanent-magnetic fields. Hole discs, toothed wheels and magnetized structures are known to be used as pulse generators. Especially the magnetoresistive effect (MR elements) or the Hall effect (Hall elements) is used as sensor effects in connection with the present invention.

In German patent application No. 196 34 715 which is later published, an arrangement for sensing the rotational behavior of a rotating encoder is described which includes a sensor module with a sensor element, a controllable current source that furnishes a load-independent current representative of the rotational behavior, and a modulator controlling the current source in response to signals of the sensor element. The sensor module is coupled magnetically to the encoder. The output signal is a signal representative of the rotational behavior with superposed status signals and/or additional signals.

Sensor modules which can resolve an unlimited low rotational speed and those which can resolve a rotational speed which is limited in terms of low values are known in the art. Sensor modules which offer the advantage of an unlimited low rotational speed resolution utilize DC coupled amplifiers and an invariably set amplification, which is restricted by the interfering direct-current portion of the signal and limits the per se possible sensor range to the encoder (air gap). This is a certain shortcoming.

Sensor modules for rotational speeds limited in terms of low values equally utilize DC coupled amplifiers, however, the interfering direct-current portion superposed on the useful signal is compensated by subtraction of a value of equal magnitude so that the useful signal can be amplified to a higher degree.

This is advantageous. For this purpose, the drifting signal direct-current portion is continuously extracted from the signal by a low-pass filter function of a low limit frequency and countercoupled to the signal so that a high-pass behavior is achieved at the output which limits the bottom rotational speed that can be sensed. This is a disadvantage in brake applications where the objective is to react from standstill, or when the standstill must be known for calibration purposes.

An object of the present invention is to provide an arrangement for sensing rotational speeds or measuring rotational speeds which furnishes precise, reliable and undisturbed measuring results, even under unfavorable conditions such as great air gap tolerances and dynamic air slot variations, over the wide rotational speed and/or frequency range that must be covered, for example, in an automotive vehicle control system (ABS, TCS, ESP, etc.).

It has been found that this object is achieved by the present invention arrangement of the type mentioned in the preamble of claim 1, including that at least the sensor element, the controllable current source and a part of the signal-conditioning circuit and the modulator are integrated in a sensor module, that the modulator controls the current source in response to the signals of the sensor element and external signals, and that the signal-conditioning circuit has at least two different signal-conditioning networks which, by way of a control network and in dependence on predetermined criteria and/or conditions, are connected between the sensor element and the modulator and take care of signal conditioning.

BRIEF DESCRIPTION OF THE DRAWINGS

FIG. 3 is a diagram showing the variation of different magnitudes as a function of the air gap.

FIG. 4 is a flow chart similar to FIG. 2 for explaining the operation of another type of embodiment of the present invention.

DETAILED DESCRIPTION OF THE PREFERRED EMBODIMENTS

Figure 1:
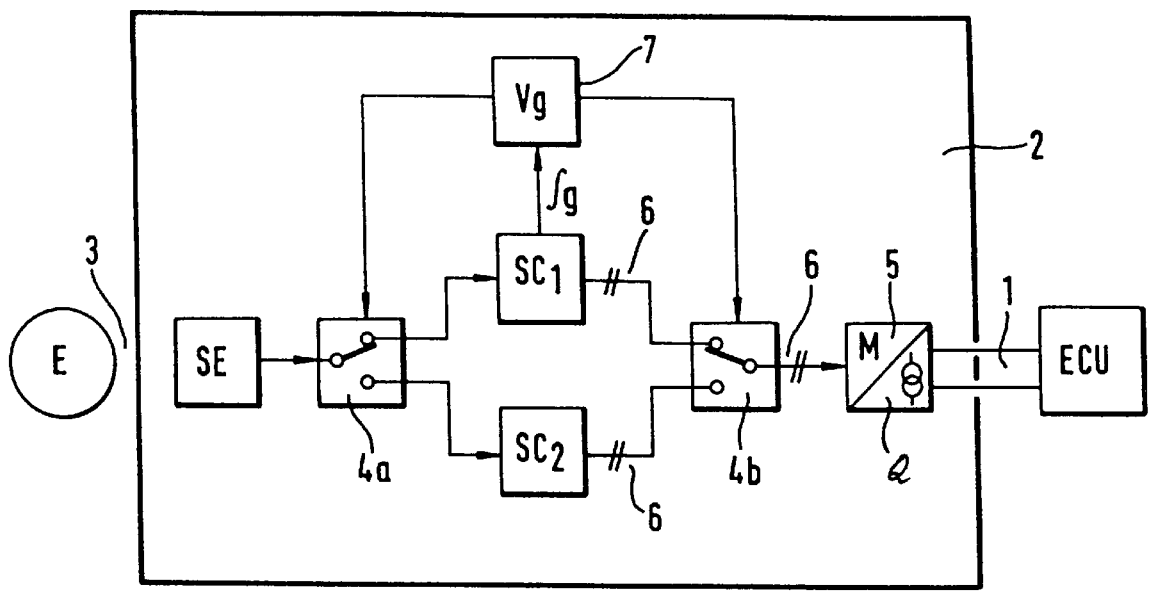
FIG. 1 is a schematic view of the most important components of an arrangement of the type of the present invention.

The FIG. 1 embodiment illustrates an arrangement of the present invention for sensing the rotational speed of an incremental pulse generator E (encoder) by means of a sensor module 2 which is coupled magnetically to the encoder by way of an air gap 3. The sensor module 2 is connected to the electronic control unit ECU of a control system, for example, an anti-lock system (ABS), by way of a two-wire line 1 which is used for the energy supply and the signal exchange. A magnetically sensitive sensor element SE changes its output signal clocked by the incremental track of the encoder. According to the present invention, the output signal of the sensor element SE, depending on the synchronous position of the commutating switches 4a, 4b, is controlled by a determined control sequence of a control network 7, and alternately conducted via one of two signal-conditioning circuits or networks $SC_1$ or $SC_2$. The signal reaches a network which includes as a basic component a modulator 5 with a controllable current source Q. In modulator 5, the conditioned SE signal and an additional status signal 6 are superposed by means of the air gap reserve and used as a control signal for the current source Q which causes variation of a load-independent current in the two-wire line 1 between different current intensities clocked by the control signal.

The signal path of the signal-conditioning network $SC_1$ in the present embodiment includes a DC coupled amplifier with an invariably set amplification without compensation of the signal direct-current portion so that an unlimited low rotational speed (v=0) can be resolved. The amplification is so fixed that a boundary air gap 3 of $L_{G1}$=60% to 75% of a maximum boundary air gap $L_{G2}$ between the sensor element SE and the encoder E can be achieved before the signal is interrupted.

In comparison thereto, the signal path of the signal-conditioning network $SC_2$ of FIG. 1 includes a DC coupled amplifier with a compensation by countercoupling the signal direct-current portion, which is continuously measured by way of a circuit with low-pass filter function of a low limit frequency so that only a rotational speed limited in terms of low values is resolved. The amplification of this signal path is not fixed but changes with an increasing/decreasing compensation effect with the low-pass time constant lagging until the steady condition of a maximum boundary amplification which simultaneously corresponds to a maximum boundary air gap $L_{G2}$. The magnitude of the maximum amplification orients itself, for example, by the achievable compensation quality or the robustness of the useful signal generated by the encoder as far as sensor interferences are concerned.

Figure 2:
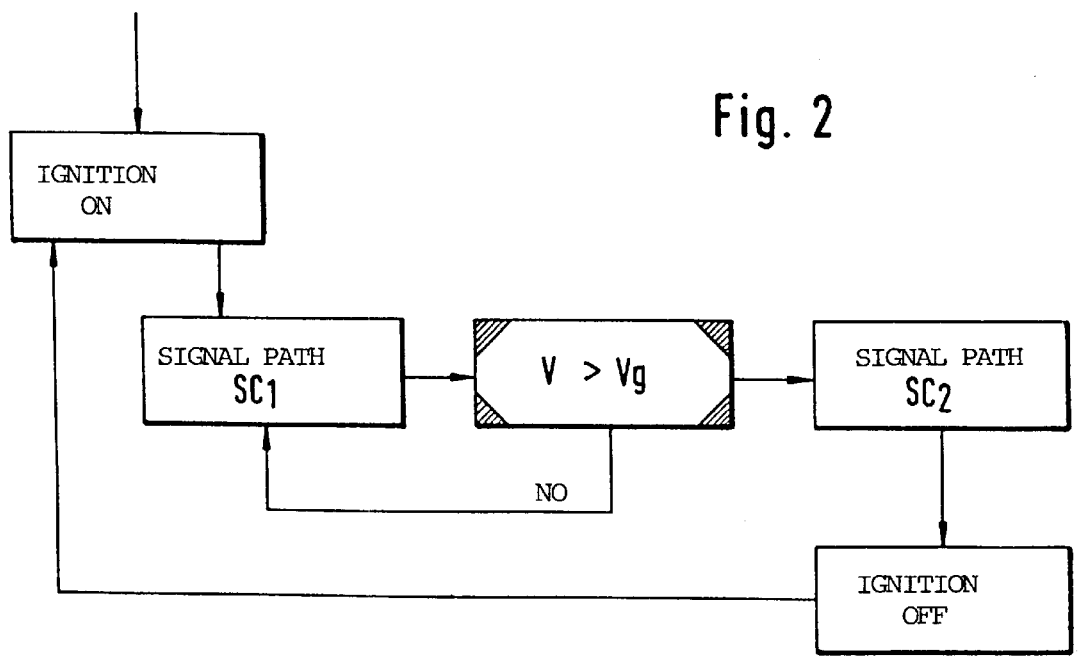
FIG. 2 is a flow chart explaining the operation of the present invention.

The arrangement of the present invention operates according to an algorithm which is shown as a flow chart in FIG. 2. FIG. 2 in conjunction with FIG. 1 is used to explain the operations. With the switching on of the ignition of a vehicle engine and the related start of the energy supply, the control network 7 automatically connects the signal path of the signal-conditioning network $SC_1$ between the sensor element SE and the modulator 5 by way of electronic selection switches 4a, 4b (FIG. 1). The control network 7 continuously measures the instantaneous encoder rotational speed or driving speed V at the signal path of $SC_1$ and checks it in terms of V>Vg by way of an internal characteristic value that corresponds to a defined limit rotational speed or limit speed Vg. When the limit speed Vg is exceeded, the control network 7 automatically connects the signal path of $SC_2$ between the sensor element SE and the modulator 5 by way of the electronic selection switches 4a, 4b. This mode of operation ends when the ignition is switched off (IGNITION OFF in FIG. 2).

The mode of operation or effect of the present invention is shown in FIG. 3 by way of a diagram which is not drawn to scale. The abscissa L corresponds to the air gap 3 (FIG. 1), and the ordinate is associated with different values. The course of curve Q represents the constant course of the signal amplitude on the two-wire line 1 as a function of the air gap 3, with the signal-conditioning network $SC_1$ interposed. The signal is interrupted when a boundary air gap $L_{G1}$ is exceeded. Associated herewith is the statistic distribution curve 9 of the air gaps to be expected with a tolerance around the nominal air gap Ln without taking into consideration dynamic deformations. Point $T_1$ marks the top statistic limit value which is within $L_{G1}$ and is hence allowable. The statistic distribution curve 11 with the limit value $T_2$ exceeds $L_{G1}$ and would not be allowable without the transition to the mode of the signal-conditioning network $SC_2$. The course of curve 10 shows the constant course of the signal amplitude on the two-wire line 1 for the mode of the signal-conditioning network $SC_2$ with the considerably extended boundary air gap $L_{G2}$ which will now no longer be reached by the limit value $T_2$ and is therefore allowable.

The limit speed Vg for the transition from $SC_1$ to $SC_2$ is adjusted to an encoder frequency which corresponds to 10 km/h approximately in one example of application. No dynamic deformations have to be expected in driving maneuvers below 10 km/h so that the boundary air gap $L_{G1}$ is sufficient. All advantages are preserved because a resolution out of zero speed is always possible by operation of $SC_1$. With rising driving speed, the air gap reserve will automatically increase.

The boundary air gaps $L_{G1}$ and $L_{G2}$ shown in the embodiment of FIG. 3 are characterized electronically by a signal voltage threshold value which is just about sufficient for the implementation of a first hysteresis mode. In an example of application of the present invention, there is provision of a second hysteresis evaluation which requires a higher signal level (e.g. the double value) for switching from one to another limit value. This second hysteresis is plotted in the FIG. 3 embodiment as a test air gap $L_{G11}$ for the mode $SC_1$ and $L_{G22}$ for the mode $SC_2$. The air gap differences ($L_{G1}$-$L_{G11}$) and ($L_{G2}$-$L_{G22}$) are herein referred to as testable air gap reserve. It is identified by a simple logical evaluation whether a large or a small air gap reserve prevails. In the event of a large air gap reserve, the signal will surpass both hysteresis thresholds associated with the respective operating mode.

According to the present invention, the inspection of the air gap reserve in the mode of the signal-conditioning network $SC_1$ can be evaluated for the installation test of the sensors during manufacture or in a repair shop. In the mode of the signal-conditioning network $SC_1$, the signal is used as an additional sensor information about reaching a dynamic limit condition and can be utilized for influencing the control behavior of an electronic brake or other aggregates.

The flow chart of FIG. 4 exhibits further use of the arrangement of FIG. 1. After the ignition is turned on, the signal path alternates between $SC_1$ and $SC_2$ as a function of driving speed. Switch-over (V>Vg) includes a sufficient hysteresis in order to avoid fluttering between the signal paths.

In further embodiments of the present invention, the sensor element SE and the signal paths of the signal-conditioning networks $SC_1$, $SC_2$ are so configured that the rotational speed and the direction of rotation are identified.

Provision is made to take advantage of the idea of the present invention in connection with arrangements which permit the ECU to send control signals to the sensor module 2 via the two-wire line 1. It is desired in this respect to either change the threshold value Vg by commands of the ECU, and/or to superpose on the control network 7 commands which cause an arbitrary change between the signal paths of the signal-conditioning networks $SC_1$, $SC_2$.

What is claim is:

1. Arrangement for sensing the rotational speed of a rotating member, comprising:

a sensor element and a controllable current source that delivers a current signal representative of the rotational behavior, a signal-conditioning circuit and a modulator having an output current signal having superposed additional information wherein the sensor element, the controllable current source and a part of the signal-conditioning circuit and the modulator are integrated in a sensor module, and wherein the modulator controls the current source in response to the signals of the sensor element or external signals, wherein the signal-conditioning circuit has at least two signal-conditioning networks which, by way of a control network, in dependence on predetermined criteria, are connected between the sensor element and the modulator and function as signal conditioners wherein the signal path of a first signal-conditioning network includes a DC coupled amplifier with an invariably set amplification, and in that the signal path of a second signal-conditioning network includes a DC coupled amplifier with a variable amplification and with a compensation of the signal direct-current portion on the amplifier input, and this compensation takes place by way of a network with a low-pass filter behavior, and the maximum value of the variable amplification is many times higher than the invariably set amplification of the first signal path.

2. Arrangement as claimed in claim 1, wherein the control network is configured as a component part of the sensor module and controls the shift from one signal-conditioning network to one or more of the other signal-conditioning networks in response to signals sent by one or more of the signal-conditioning networks or supplied from outside.

3. Arrangement as claimed in claim 2, wherein the control network controls the shift from one to the other signal-conditioning network in response to signals which are sent to the sensor module from a signal-receiving circuit outside the sensor module by way of the same signal line.

4. Arrangement as claimed in claim 1, wherein the control network derives the control signal for shift from one to the other signal-conditioning network exclusively from one of the signal-conditioning networks, and the exceeding of a predetermined frequency limit value or a predetermined value of the rotational speed being measured is assessed as a criterion for the network change.

5. Arrangement as claimed in claim 1, wherein said arrangement is implemented in an automotive vehicle with an internal combustion engine, and wherein the ignition of the vehicle engine is switched on, the control network automatically activates initially a first signal-conditioning network between the sensor element and the modulator, and in that after a predetermined rotational speed is exceeded there will be a shift to a second signal-conditioning network which then determines signal conditioning until the ignition of the vehicle engine is switched off.

6. Arrangement as claimed in claim 5, wherein after the ignition of the vehicle engine is switched on, the control network automatically activates initially a first signal-conditioning network between the sensor element and the modulator and switches over to a second signal-conditioning network after a predetermined rotational speed is exceeded, and when the rotational speed falls under another predetermined value, the first signal-conditioning network is switched on again and this change is continued as a function of the rotational speed until the ignition of the vehicle engine is switched off.

7. Arrangement as claimed in claim 1, wherein the evaluation of the amplitude of the preamplified signal voltage of the sensor element in the signal paths of the signal-conditioning networks is performed by way of two different hysteresis thresholds, and when the first signal-conditioning network is enabled, the simultaneous exceeding of both hysteresis thresholds is assessed as a quality criterion for a correct sensor installation during manufacture or maintenance, and when a hysteresis threshold remains under, with the second signal-conditioning network enabled, this condition is evaluated as an additional information, derived by the sensor, for characterizing the reaching of a dynamic and/or thermally induced limit condition, permitting variation of the control of an electronic brake system or other electronically influenceable aggregates, such as an engine control.

* * * * *